|| 
US007290209B2

(12) United States Patent
Brill et al.

(10) Patent No.: US 7,290,209 B2
(45) Date of Patent: Oct. 30, 2007

(54) SPELL CHECKER WITH ARBITRARY LENGTH STRING-TO-STRING TRANSFORMATIONS TO IMPROVE NOISY CHANNEL SPELLING CORRECTION

(75) Inventors: Eric Brill, Redmond, WA (US); Robert Moore, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 65 days.

(21) Appl. No.: 11/182,388

(22) Filed: Jul. 15, 2005

(65) Prior Publication Data

US 2005/0251744 A1 Nov. 10, 2005

Related U.S. Application Data

(63) Continuation of application No. 09/539,357, filed on Mar. 31, 2000, now Pat. No. 7,047,493.

(51) Int. Cl.
*G06N 3/00* (2006.01)
(52) U.S. Cl. ..................................................... 715/533
(58) Field of Classification Search ................ 715/513, 715/517, 523, 530, 533
See application file for complete search history.

(56) References Cited

U.S. PATENT DOCUMENTS

| 4,383,307 A | 5/1983 | Gibson, III |
| 4,833,610 A | 5/1989 | Zamora et al. |
| 5,095,432 A | 3/1992 | Reed |
| 5,175,803 A | 12/1992 | Yeh |
| 5,214,583 A | 5/1993 | Miike et al. |
| 5,218,536 A | 6/1993 | McWherter |
| 5,258,909 A | 11/1993 | Damerau et al. |
| 5,278,943 A | 1/1994 | Gasper et al. |
| 5,319,552 A | 6/1994 | Zhong |
| 5,510,998 A | 4/1996 | Woodurff et al. |
| 5,521,816 A | 5/1996 | Roche et al. |
| 5,535,119 A | 7/1996 | Ito et al. |
| 5,572,423 A | 11/1996 | Church |
| 5,594,642 A | 1/1997 | Collins et al. |
| 5,646,840 A | 7/1997 | Yamauchi et al. |

(Continued)

FOREIGN PATENT DOCUMENTS

GB 1158776 7/1969

OTHER PUBLICATIONS

Church, K. and W. Gale (1991). "Probability Scoring for Spelling Correction." Statistics and Computing 1 pp. 93-103.□□.*

(Continued)

*Primary Examiner*—Stephen Hong
*Assistant Examiner*—Kyle R Stork
(74) *Attorney, Agent, or Firm*—Lee & Hayes, PLLC

(57) ABSTRACT

A spell checker based on the noisy channel model has a source model and an error model. The source model determines how likely a word w in a dictionary is to have been generated. The error model determines how likely the word w was to have been incorrectly entered as the string s (e.g., mistyped or incorrectly interpreted by a speech recognition system) according to the probabilities of string-to-string edits. The string-to-string edits allow conversion of one arbitrary length character sequence to another arbitrary length character sequence.

10 Claims, 5 Drawing Sheets

U.S. PATENT DOCUMENTS

| | | |
|---|---|---|
| 5,652,898 A | 7/1997 | Kaji |
| 5,671,426 A | 9/1997 | Armstrong, III |
| 5,704,007 A | 12/1997 | Cecys |
| 5,715,469 A | 2/1998 | Arning |
| 5,732,276 A | 3/1998 | Komatsu et al. |
| 5,774,834 A | 6/1998 | Visser |
| 5,781,884 A | 7/1998 | Pereira et al. |
| 5,806,021 A | 9/1998 | Chen et al. |
| 5,835,924 A | 11/1998 | Maruyama et al. |
| 5,893,133 A | 4/1999 | Chen |
| 5,907,705 A | 5/1999 | Carter |
| 5,930,755 A | 7/1999 | Cecys |
| 5,933,525 A | 8/1999 | Makhoul et al. |
| 5,956,739 A | 9/1999 | Golding et al. |
| 5,970,492 A | 10/1999 | Nielsen |
| 5,974,371 A | 10/1999 | Hirai et al. |
| 5,974,413 A | 10/1999 | Beauregard et al. |
| 5,987,403 A | 11/1999 | Sugimura |
| 6,047,300 A | 4/2000 | Walfish et al. |
| 6,073,146 A | 6/2000 | Chen |
| 6,131,102 A | 10/2000 | Potter |
| 6,148,285 A | 11/2000 | Busardo |
| 6,154,758 A | 11/2000 | Chiang |
| 6,173,252 B1 | 1/2001 | Qiu et al. |
| 6,246,976 B1 | 6/2001 | Mukaigawa et al. |
| 6,256,630 B1 | 7/2001 | Gilai et al. |
| 6,356,866 B1 | 3/2002 | Pratley et al. |
| 6,374,210 B1 | 4/2002 | Chu |
| 6,490,563 B2 | 12/2002 | Hon et al. |
| 6,573,844 B1 | 6/2003 | Venolia et al. |
| 6,646,572 B1 | 11/2003 | Brand |
| 6,848,080 B1 | 1/2005 | Lee et al. |
| 7,047,493 B1 | 5/2006 | Brill et al. |
| 7,076,731 B2 | 7/2006 | Brill et al. |

OTHER PUBLICATIONS

Brill, Eric and Robert C. Moore (2000). "An Improved Error Model for Noisy Channel Spelling Correction."*

* cited by examiner

| | a | c | | t | u | a | l |
|---|---|---|---|---|---|---|---|
| | ↓ | ↓ | ↓ | ↓ | ↓ | ↓ | ↓ |
| | a | k | g | s | u | a | l |
| Edit | Mat | Sub | Ins | Sub | Mat | Mat | Mat |
| Weight | 0 | 1 | 1 | 1 | 0 | 0 | 0 |

*Fig. 5*

| | a | ct | u | a | l |
|---|---|---|---|---|---|
| | ↓ | ↓ | ↓ | ↓ | ↓ |
| | a | kgs | u | a | l |
| Edit | Mat | Sub | Mat | Mat | Mat |

*Fig. 6*

SPELL CHECKER WITH ARBITRARY LENGTH STRING-TO-STRING TRANSFORMATIONS TO IMPROVE NOISY CHANNEL SPELLING CORRECTION

RELATED APPLICATIONS

This continuation patent application claims priority to U.S. patent application Ser. No. 09/539,357 to Brill et al., filed Mar. 31, 2000 and entitled, "Spell Checker With Arbitrary Length String to String Transformations to Improve Noisy Channel Spelling Correction", which issued as U.S. Pat. No. 7,047,493 on May 16, 2006.

TECHNICAL FIELD

This invention relates to spell checkers used in computer programs to identify and potentially correct misspelled words.

BACKGROUND

Spell checkers are well-known program components used in computer programs to inform users that a word is misspelled, and in some cases, to correct the error to the appropriate spelling. Word processing programs, email programs, spreadsheets, browsers, and the like are examples of computer programs that employ spell checkers.

One conventional type of spell checker corrects errors in an ad-hoc fashion by manually specifying the types of allowable edits and the weights associated with each edit type. For the spell checker to recognize an entry error "fysical" and correct the error to the appropriate word "physical", a designer manually specifies a substitution edit type that allows substitution of the letters "ph" for the letter "f". Since it is built manually, this approach does not readily port to a new language or adapt to an individual's typing style.

Another type of spell checker is one that learns errors and weights automatically, rather than being manually configured. One type of trainable spell checker is based on a noisy channel model, which observes character strings actually entered by a user and attempts to determine the intended string based on a model of generation.

Spell checkers based on the noisy channel model have two components: (1) a word or source generation model, and (2) a channel or error model. The source model describes how likely a particular word is to have been generated. The error model describes how likely a person intending to input X will instead input Y. Together, the spell checker attempts to describe how likely a particular word is to be the intended word, given an observed string that was entered.

As an example, suppose a user intends to type the word "physical", but instead types "fysical". The source model evaluates how likely the user is to have intended the word "physical". The error model evaluates how likely the user is to type in the erroneous word "fysical" when the intended word is "physical".

The classic error model computes the Levenshtein Distance between two strings, which is the minimum number of single letter insertions, deletions, and substitutions needed to transform one character string into another. The classic error model is described in Levenshtein, V. "Binary Codes Capable of Correcting Deletions, Insertions and Reversals." Soviet Physics—Doklady 10, 10, pp. 707-710. 1966.

A modification of the classic error model employs a Weighted Levenshtein Distance, in which each edit operation is assigned a different weight. For instance, the weight assigned to the operation "Substitute e for i" is significantly different than the weight assigned to the operation "Substitute e for M". Essentially all existing spell checkers that are based on edit operations use the weighted Levenshtein Distance as the error model, while sometimes adding a small number of additional edit templates, such as transposition, doubling, and halving.

The error model can be implemented in several ways. One way is to assume all edits are equally likely. In an article by Mays, E., Damerau, F, and Mercer, R. entitled "Context Based Spelling Correction," Information Processing and Management, Vol. 27, No. 5, pp. 517-522, 1991, the authors describe pre-computing a set of edit-neighbors for every word in the dictionary. A word is an edit-neighbor of another word, if it can be derived from the other word from a single edit, where an edit is defined as a single letter insertion (e.g., $\varnothing \rightarrow a$), a single letter substitution (e.g., $a \rightarrow b$), a single letter deletion (e.g., $a \rightarrow \varnothing$), or a letter-pair transposition (e.g., $ab \rightarrow ba$). For every word in a document, the spell checker determines whether any edit-neighbor of that word is more likely to appear in that context than the word that was typed. All edit-neighbors of a word are assigned equal probability of having been the intended word, and the context is used to determine which word to select. It is noted that the word itself (if it is in the dictionary) is considered an edit-neighbor of itself, and it is given a much higher probability of being the intended word than the other edit-neighbors.

A second way to implement the error model is to estimate the probabilities of various edits from training data. In an article by Church, K. and Gale, W., entitled "Probability Scoring for Spelling Correction," Statistics and Computing 1, pp. 93-103, 1991, the authors propose employing the identical set of edit types used by Mays et al. (i.e., single letter insertion, substitution, deletion, and letter-pair transposition) and automatically deriving probabilities for all edits by computing the probability of an intended word w given an entered string s. The Church et al. method trains on a training corpus to learn the probabilities for each possible change, regardless of the correct word and entered word. In other words, it learns the probability that an erroneous input string s will be written when the correct word w was intended, or $P(s|w)$. The Church et al. method improves insertion and deletion by including one character of context.

The error model probability $P(s|w)$ used in noisy channel spell correction programs, such as the one described in Church et al., may seem backwards initially because it suggests finding how likely a string s is to be entered given that a dictionary word w is intended. In contrast, the spell correction program actually wants to know how likely the entered string s is to be a word w in the dictionary, or $P(w|s)$. The error model probability $P(s|w)$ comes from Bayes formula, which can be used to represent the desired probability $P(w|s)$ as follows:

$$P(w|s) = \frac{P(s|w) \cdot P(w)}{P(s)}$$

The denominator $P(s)$ remains the same for purposes of comparing possible intended words given the entered string. Accordingly, the spell checking analysis concerns only the numerator product $P(s|w) \cdot P(w)$, where the probability $P(s|w)$ represents the error model and the probability $P(w)$ represents the source model.

As application programs become more sophisticated and the needs of users evolve, there is an ongoing need to improve spell checkers. The inventors have developed an improved spell checker that is based on the noisy channel model, which incorporates a more powerful error model component.

SUMMARY

A spell checker based on the noisy channel model has a source model and an error model. The source model determines how likely a word w in a dictionary is to have been generated. The error model determines how likely the word w was to have been incorrectly entered as the string s (e.g., mistyped or incorrectly interpreted by a speech recognition system).

The error model determines this probability based on edit operations that convert arbitrary length character sequences in the word w to arbitrary length character sequences in the string s. These edit operations are characterized as $\alpha \rightarrow \beta$, where $\alpha$ is one character sequence of zero or more characters and $\beta$ is another character sequence of zero or more characters. In many cases, the number of characters in each sequence $\alpha$ and $\beta$ will be different. In this manner, the edit operations are not constrained or limited to the specified set of changes, such as single letter insertion, deletion, or substitution.

The error model determines how likely a word w in the dictionary was to have been mistyped as the string s (i.e. P(s|w)) according to the probabilities of the string-to-string edits. One implementation is to find all possible sets of string-to-string edits that transform the word w into the string s, calculating P(s|w) for each set and then summing over all sets. The probabilities are derived through a training process that initially uses Levenshtein Distance or other cost metric to find the least cost alignment of characters in a pair of wrong and right inputs.

BRIEF DESCRIPTION OF THE DRAWINGS

FIG. 5 is a diagrammatic illustration of an alignment technique used during training of an error model employed in the spell checker.

FIG. 6 is a diagrammatic illustration of the alignment technique of FIG. 5 at a point later in the process.

DETAILED DESCRIPTION

This invention concerns a spell checker used in computer programs to identify and, in some cases, correct misspelled words. The spell checker may be used in many different applications, including word processing programs, email programs, spreadsheets, browsers, and the like. For discussion purposes, the spell checker is described in the context of a spell correction program implemented in a word processing program.

However, aspects of this invention may be implemented in other environments and in other types of programs. For instance, the invention may be implemented in language conversion software (e.g., Japanese Katakana to English) that may implement string-to-string mapping.

Exemplary Computing Environment

Figure 1:
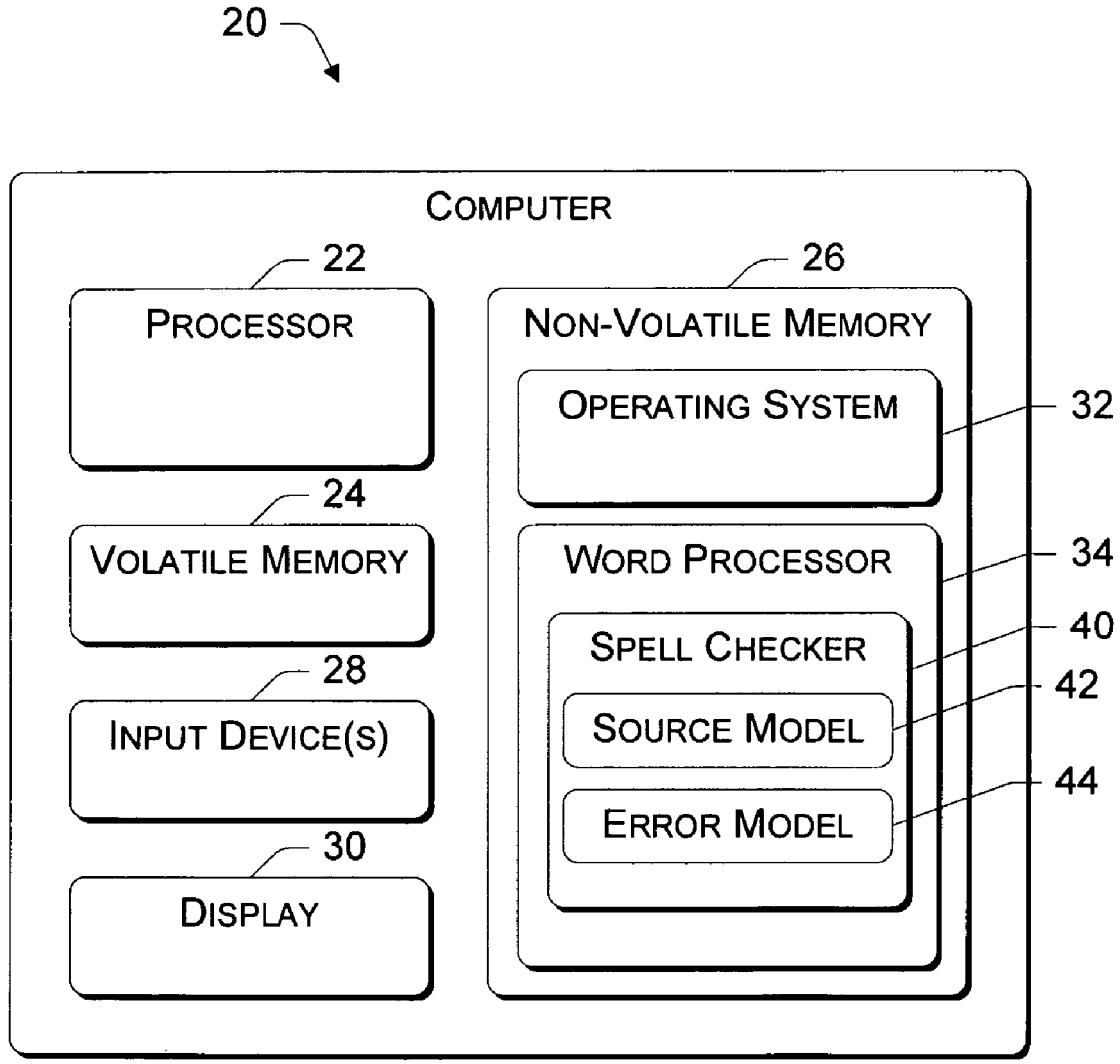
FIG. 1 is a block diagram of an exemplary computer that runs a spell checker.

FIG. 1 shows an exemplary computer 20 having a processor 22, volatile memory 24 (e.g., RAM), and non-volatile memory 26 (e.g., ROM, Flash, hard disk, floppy disk, CD-ROM, etc.). The computer 20 also has one or more input devices 28 (e.g., keyboard, mouse, microphone, stylus, etc.) and a display 30 (e.g., monitor, LCD, etc.). The computer may also have other output devices (now not shown), such as a speaker. The computer 20 is representative of many diverse types of computing devices, including desktop computers, laptops, handheld computers, set-top boxes, information appliances, and so forth.

The computer 20 runs an operating system 32 and a word processing application program 34. For purposes of illustration, operating system 32 and word processor 34 are illustrated herein as discrete blocks stored in the non-volatile memory 26, although it is recognized that such programs and components reside at various times in different storage components of the computer 20 and are executed by the processor 22. Generally, these software components are stored in non-volatile memory 26 and from there, are loaded at least partially into the volatile main memory 24 for execution on the processor 22.

The word processor 34 includes a spell correction program 40 that identifies and, where appropriate, corrects misspelled words that the user has entered. The user enters the words in a conventional manner, such as typing them in on a keyboard, using a stylus to input individual letters, or speaking words into a microphone. In the event voice entry is employed, the computer 20 would also implement a speech recognition program (not shown) to convert voice input to words.

The spell correction program 40 is based on the noisy channel model and has two components: a source model 42 and an error model 44. The source model 42 includes computer-executable instructions that determine how likely a particular word w in a dictionary D is to have been generated in this particular context. The source model is represented statistically as the probability P(w|context). The error model 44 includes computer-executable instructions that determine how likely a user is to enter the string s when intending to enter the word w. The error model is represented statistically as the probability P(s|w).

Accordingly, the spell checker 40 attempts to correct an erroneously entered string s into a word w by returning the change that maximizes the probabilities of the source and error models, as follows:

$$\underset{w \in D}{\mathrm{argmax}} P(s \mid w) \times P(w \mid context)$$

The source and error models are independent of each other. Thus, different source models 42 may be used interchangeably with the preferred error model described below. The source model 42 may be implemented as a language model, if one is available. In this case, P(w|context) is the probability of word w, given the context words that the user had entered prior to w. If the relative word probabilities are known, but not anything about how the words are used in context, P(w|context) can be reduced to P(w). Finally, if the spell checker knows nothing about the relative word probabilities of the user generating words in the dictionary, the source model can be eliminated entirely by setting $$P(w \mid context) \text{ to } \frac{1}{|D|}$$

for all w.

Improved Error Model 44

Unlike conventional error models, the error model 44 employed in spell checker 40 permits edit operations that convert a first string of arbitrary size to a second string of arbitrary size. That is, given an alphabet V and arbitrary length character sequences α and β, the error model 44 allows edit operations of the form α→β, where α, β∈V* (where V* represents the set of all strings of characters in V of length 0 or more). Each character sequence α and β may have zero or more characters and in many cases, the number of characters in each sequence α and β will be different. In this manner, the edit operations are not constrained or limited to a specified set of changes, such as single letter insertion, deletion, or substitution.

The error model 44 can therefore be characterized as the probability that, when a user intends to type a character sequence α, he/she instead types β. This is represented as the probability P(β|α). The error model probability P(s|w) can then be expressed as a set of probabilities describing various arbitrary length string-to-string conversions, as follows:

$$P(s|w)=P(\beta_1|\alpha_1)*P(\beta_2|\alpha_2)*P(\beta_3|\alpha_3)* \ldots *P(\beta_n|\alpha_n)$$

One implementation of the error model 44 is to find all possible sets of string-to-string edits that transform the word w into the string s, calculate the probability P(s|w) for each set using the above formula, and sum over all sets. More particularly, for each possible word w that the erroneous string s might be, the error model 44 partitions the word w and string s into different numbers of segments that define varying lengths of character sequences. For example, suppose the dictionary word is "physical" and the number of partition segments is five. One possible partition is, say, "ph y s ic al". Now, suppose that a generates each partition, possibly with errors. One possible result of the user input is a string "fisikle" with a five-segment partition "f i s ik le".

The error model then computes the probability P(β|α) for each associated segment pair, such as P(f|ph), P(i|y), and so on. The error model probability P(f i s ik le|ph y s ic al) can then be expressed as the product of these segment pair probabilities, as follows:

$$P(f\ i\ s\ ik\ le|ph\ y\ s\ ic\ al)=P(f|ph)*P(i|y)*P(s|s)*P(ik|ic)*P(le|al).$$

The error model 44 examines all probabilities for all partitions over all possible words and selects the word that returns the highest probability, summed over all partitions. For example, let Part(w) be the set of all possible ways of partitioning word w and Part(s) be the set of all possible ways of partitioning the entered string s. For a particular partition R of the word w (i.e., R∈Part(w), where |R|=contiguous segments), let partition $R_i$ be the $i^{th}$ segment. Similarly, for a particular partition T of the string s (i.e., T∈Part(s), where |T|=j contiguous segments), let partition $T_i$ be the $i^{th}$ segment. The error model 44 computes:

$$P(s \mid w) = \sum_{R \in Part(w)} P(R \mid w) \sum_{\substack{T \in Part(s) \\ |T|=|R|}} \prod_{i=1}^{|R|} P(T_i \mid R_i)$$

The first summation sums probabilities over all possible partitions of the word w. For a given partition R, the second summation sums over all possible partitions of the string s, with the restriction that both partitions must have the same number of segments. The product then multiplies the probabilities of each Ri→Ti.

To demonstrate this computation, consider the word "physical" and the five-segment partition. The error model 44 tries different partitions R of the word, and for each word partition R, tries different partitions T of the entered string. For each combination, the error model 44 computes a corresponding probability P(s|w), as illustrated in Table 1:

TABLE 1

| Partitions | Probabilities P(s|w) |
|---|---|
| $R_1$: ph y s ic al | |
| $T_1$: f i s ik le | P(f|ph) *P(i|y) * P(s|s) * P(ik|ic) *P(le|al) |
| $T_2$: fi s i k le | P(fi|ph) *P(s|y) * P(i|s) * P(k|ic) *P(le|al) |
| $T_3$: fis i k l e | P(fis|ph) *P(i|y) * P(i|s) * P(l|ic) *P(e|al) |
| $T_4$: fis ik le _ _ | P(fis|ph) *P(ik|y) * P(le|s) * P( |ic) *P( |al) |
| $T_5$: . . . | . . . |
| $R_2$: phy si cal _ _ | |
| $T_1$: f i s ik le | P(f|phy) *P(i|si) * P(s|cal) * P(ik| ) *P(le| ) |
| $T_2$: fi s i k le | P(fi|phy) *P(s|si) * P(i|cal) * P(k| ) *P(le| ) |
| $T_3$: fis i k l e | P(fis|phy) *P(i|si) * P(i|cal) * P(l| ) *P(e| ) |
| $T_4$: fis ik le _ _ | P(fis|phy) *P(ik|si) * P(le|cal) * P( | ) *P( | ) |
| $T_5$: . . . | . . . |
| $R_2$: . . . | |

After all permutations have been computed for a five-segment partition, the error model repeats the process for partitions of more or less than five segments. The error model 44 selects the word that yields the highest probability P(s|w), summed over all possible partitions. The spell checker 40 uses the error model probability, along with the source model probability, to determine whether to autocorrect the entered string, leave the string alone, or suggest possible alternate words for the user to choose from.

If computational efficiency is a concern, the above relationship may be approximated as follows:

$$P(s \mid w) = \max_{R \in Part(w), T \in Part(s)} P(R \mid w) * \prod_{i=1}^{|R|} P(T_i \mid R_i)$$

Two further simplifications can be made during implementation that still provides satisfactory results. One simplification is to drop the term P(R|w). Another simplification is to set the terms $P(T_i|R_i)=1$ whenever $T_i=R_i$.

The error model 44 has a number of advantages over previous approaches. First, the error model is not constrained to single character edits, but robustly handles conversion of one arbitrary length string to another arbitrary length string. As noted in the Background, virtually all conventional spell checkers based on the noisy channel model use a fixed set of single character edits—insertion, deletion, and substitution—with some checkers also including simple transposition, doubling, and halving. However, people often mistype one string for another string, where one or both of the strings has length greater than one. These types of errors cannot be modeled succinctly using the conventional Weighted Levenshtein Distance.

The error model 44 captures the traditional single character edits, transposition, doubling, and halving, as well as many phenomena not captured in such simpler models. For example, if a person mistypes "philosophy" as "filosofy", the error model 44 captures this directly by the edit "ph→f", whereby a two-character string is converted to a single character string. Even when an error is a single letter substitution, often the environment in which it occurs is significant. For instance, if a user enters "significant" as "significent", it makes more sense to describe this by the edit operation "ant→ent" than simply by "a→e".

Another advantage of the error model 44 is that it can implement an even richer set of edits by allowing an edit to be conditioned on the position that the edit occurs, $P(\alpha \rightarrow \beta | PSN)$, where PSN describes positional information about the substring within the word. For example, the position may be the start of a word, the end of a word, or some other location within the word (i.e., PSN={start of word, end of word, other}). The spell checker adds a start-of-word symbol and an end-of-word symbol to each word to provide this positional information.

Figure 2:
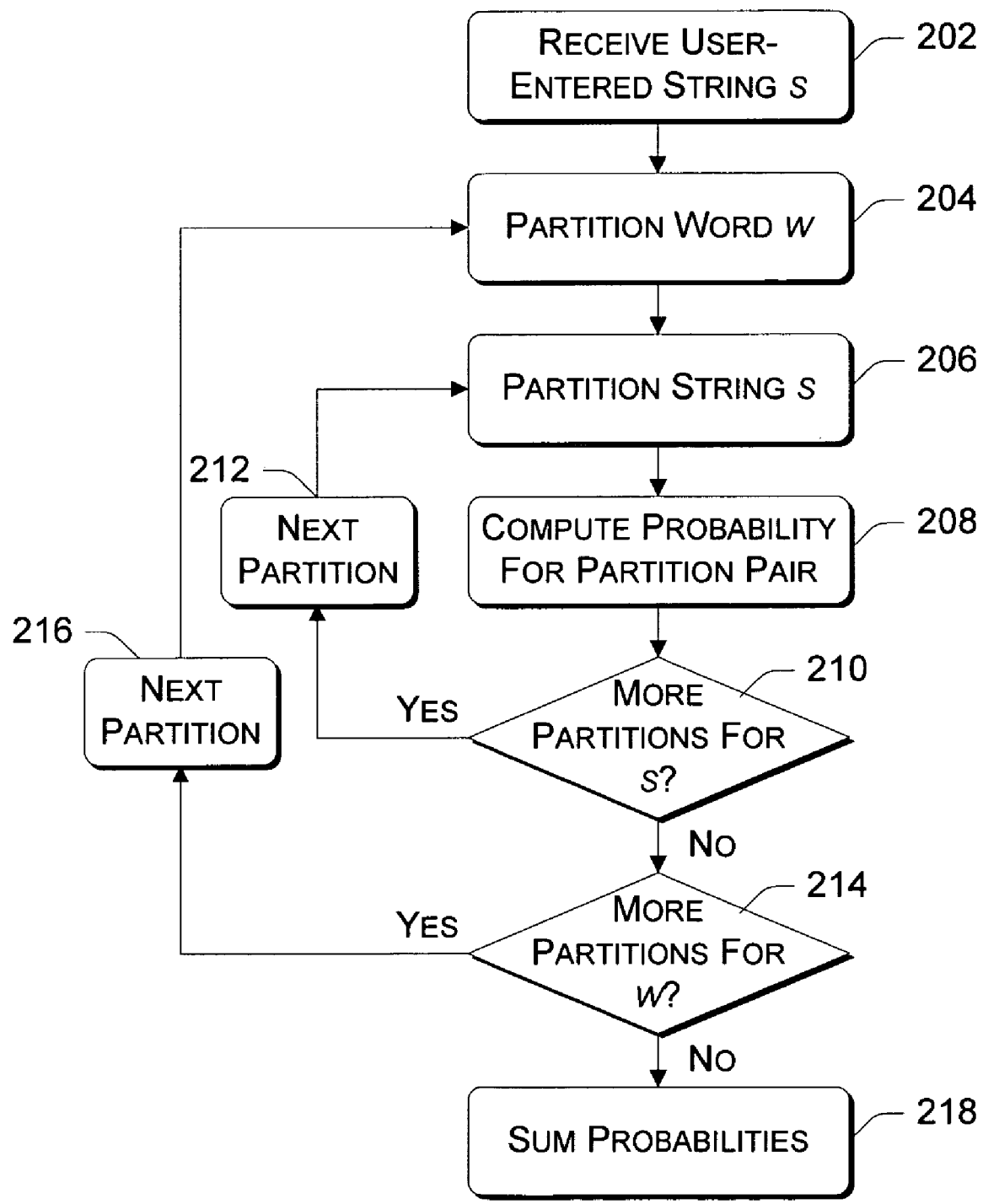
FIG. 2 is a flow diagram of a process implemented by the spell checker to compute a probability P(s|w) given an erroneously entered string s and a dictionary word w.

FIG. 2 shows the process implemented by the spell checker 40 to compute a probability $P(s|w)$ given an entered string s and a dictionary word w. At block 202, the spell checker receives a user-entered string s that might contain errors. Assume that the entered word is "fisikle". Given this entered string s, the spell checker iterates over all words w. Suppose, for sake of discussion, the current word w is "physical".

At block 204, the word w is partitioned into multiple segments. The word "physical" is partitioned, for example, into five segments "ph y s ic al". At block 206, the string s is partitioned into the same number of segments, such as "f i s ik le".

At block 208, the error model computes a probability for this pair of partitioned strings as $P(f|ph)*P(i|y)*P(s|s)*P(ik|ic)*P(le|al)$ and temporarily stores the result. The error model considers other partitions of the user-entered string s against the partitioned word w, as represented by the inner loop blocks 210 and 212. With each completion of all possible partitions of the user-entered string s, the error model 44 iteratively tries different partitions of the word w, as represented by the outer loop blocks 214 and 216.

At block 218, when all possible combinations of partitions have been processed, the error model 44 sums the probabilities to produce the probability $P(s|w)$.

Training the Error Model

The error model 44 is trained prior to being implemented in the spell checker 40. The training is performed by a computing system, which may be the same computer as shown in FIG. 1 (i.e., the model is trained on the fly) or a separate computer employed by the developer of the spell checker (i.e., the model is trained during development). The training utilizes a training set or corpus that includes correct dictionary words along with errors observed when a user enters such words. One technique for training the error model is to use a training set consisting of <wrong, right> training pairs. Each training pair represents a spelling error together with the correct spelling of the word.

Figure 3:
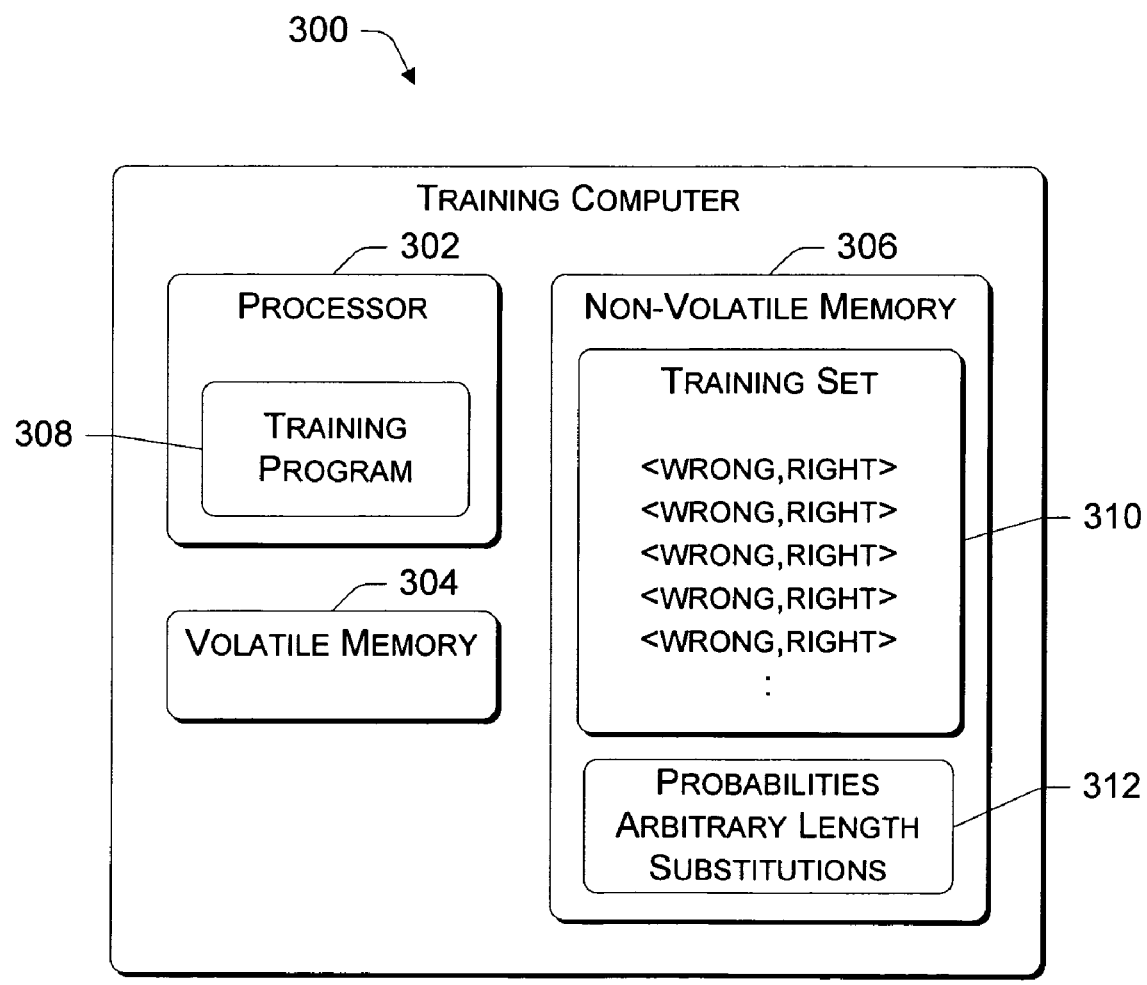
FIG. 3 is a block diagram of a training computer used to train the spell checker.

FIG. 3 shows a training computer 300 having a processor 302, a volatile memory 304, and a non-volatile memory 306. The training computer 300 runs a training program 308 to produce probabilities of different arbitrary-length string-to-string corrections ($\alpha \rightarrow \beta$) over a large set of training words and associated mistakes observed from entry of such words. The training program 308 is illustrated as executing on the processor 302, although it is loaded into the processor from storage on non-volatile memory 306.

Training computer 300 has a training set 310 stored in non-volatile memory 306 (i.e., hard disk(s), CD-ROM, etc.). The training set has <wrong, right> training pairs. As an example, the training set 310 may have 10,000 pairs. The training computer uses the training set to derive probabilities associated with how likely the right word is to be changed to the wrong word. The probabilities are based on the least cost way to edit an arbitrary length character sequence $\alpha$ into another arbitrary length character sequence $\beta$ (i.e., $\alpha \rightarrow \beta$).

Figure 4:
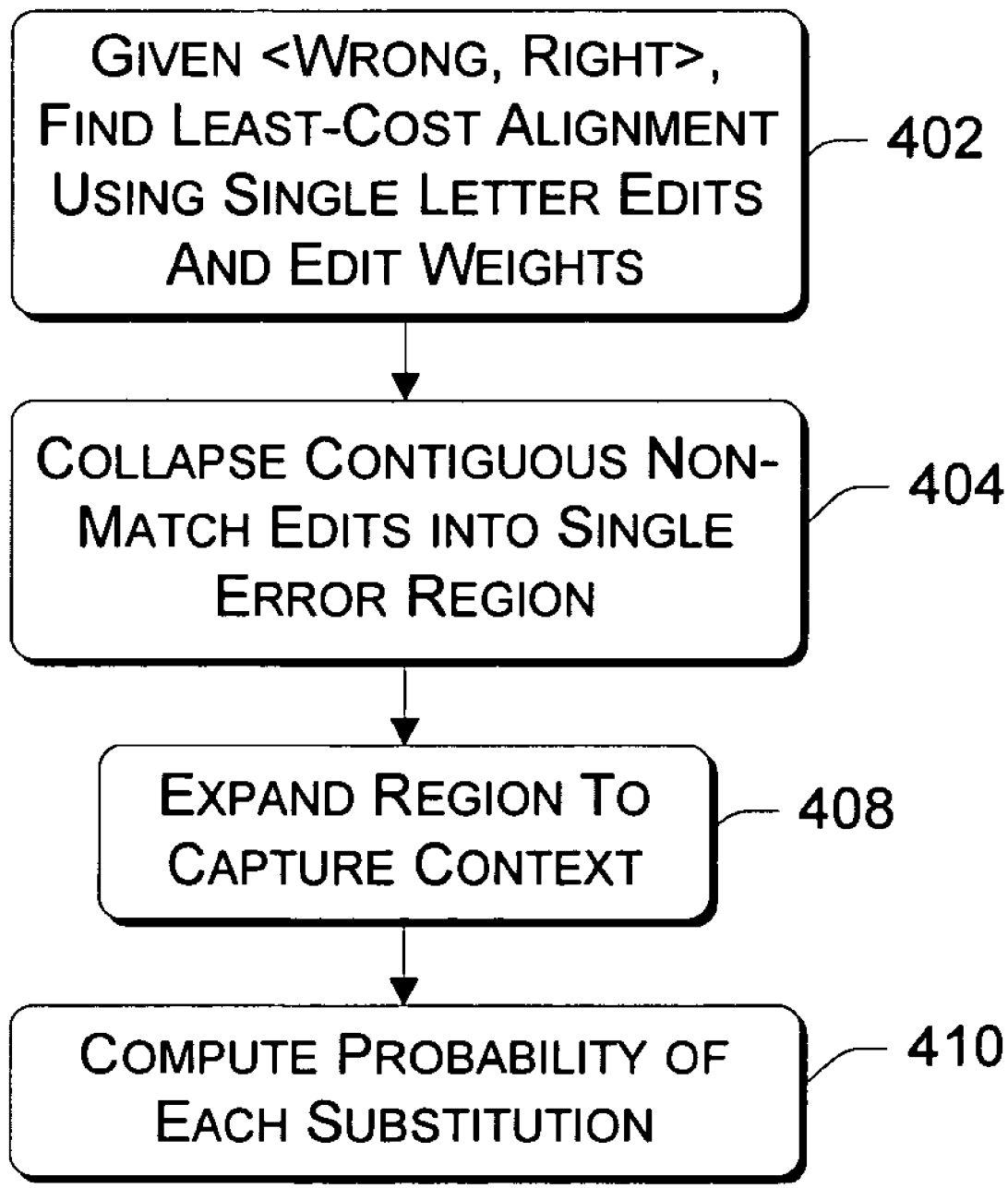
FIG. 4 is a flow diagram of a training method implemented by the training computer.

FIG. 4 shows a training method implemented by the training program 308. At block 402, the training method arranges the wrong and right words according to single letter edits: insertion (i.e., $\emptyset \rightarrow a$), substitution (i.e., $a \rightarrow b$), deletion (i.e., $a \rightarrow \emptyset$), and match (i.e., a =a). The edits are assigned different weights. Using the Levenshtein Distance, for example, a match is assigned a weight of 0 and all other edits are given a weight of 1. Given a <Wrong, Right> training pair, the training method finds the least-cost alignment using single letter edits and edit weights.

FIG. 5 shows one possible least-cost alignment of a training pair <akgsual, actual>. In the illustrated alignment, the first letters "a" in each string match, as represented by the label "Mat" beneath the associated characters. This edit type is assessed a weight of 0. The second letters do not match. A substitution edit needs to be performed to convert the "c" into the "k", as represented by the legend "Sub". This edit type is assigned a weight of 1. There is no letter in the right word "actual" that corresponds to the letter "g" in the wrong word "akgsual" and hence an insertion edit is needed to insert the "g". Insertion is represented by the legend "Ins" and is given a weight of 1. Another substitution is needed to convert the "t" into an "s", and this substitution is also assessed a weight of 1. The last three letters in each string are matched and are accorded a weight of 0.

The alignment in FIG. 5 is one example of a least-cost alignment, having an edit cost of 3. Other alignments with the same cost may exist. For instance, perhaps the letter "g" in "akgsual" may be aligned with "t" and "s" with space. This alternate alignment results in the same cost of 3. Selection of one alignment in such ties is handled arbitrarily.

After this initial alignment, all contiguous non-match edits are collapsed into a single error region (block 404 in FIG. 4). There may be multiple error regions in a given training pair, but the contiguous non-match edits are combined as common regions. Using the alignment of training pair <akgsual, actual> in FIG. 5, the contiguous "substitution-insertion-substitution" edits are collapsed into a single substitution edit "ct→kgs".

FIG. 6 shows the training pair <akgsual, actual> after all contiguous non-match edits are collapsed. Now, there is only one non-match edit, namely a generic substitution operation "ct→kgs".

An alternate way of training is to not collapse contiguous non-match edits. Given the alignment shown in FIG. 5, this would result in three substitution operations: c→k, NULL→g and t→s, instead of the single substitution operation obtained by collapsing.

To allow for richer contextual information, each substitution is expanded to incorporate one or more edits from the left and one or more edits from the right (block 406 in FIG. 4). As an example, the expansion might entail up to two edits from the left and two edits from the right. For the substitution "ct→kgs", the training method generates the following substitutions:

ct→kgs
act→akgs
actu→akgsu
ctu→kgsu
ctua→kgsua

Each of these possible substitutions is assigned an equal fractional count, such as one-fifth of a count per substitution.

At block 408, the probability of each substitution α→β is computed as count(α→β)/count(α). For instance, to compute P(ct→kgs), the method first sums up all of the counts found for the edit ct→kgs in the training corpus. Then, the method counts the number of times the substring "ct" is seen in a suitably sized corpus of representative text, and divides the first count by the second.

After obtaining the set of edits and edit probabilities, the process may iteratively re-estimate the probabilities using a form of the well known E-M algorithm, similar to the retraining method described in the Church paper. However, the inventors have observed that very good results can be obtained without re-estimating the parameters.

By varying the training set 310, the error model 44 may be trained to accommodate the error profiles on a user-by-user basis, or on a group-by-group basis. For instance, a user with dyslexia is likely to have a very different error profile than somebody without dyslexia. An English professor is likely to have a very different error profile from a third grader, and a native Japanese speaker entering English text is likely to have a very different error profile from a native English speaker.

Therefore, the efficacy of the spelling correction program can be improved further if it is trained to the particular error profile of an individual or subpopulation. For a relatively static subpopulation, the training set 310 is created to contain <wrong, right> pairs from the subpopulation. The error model 44 is then trained based on this training set.

For individuals, a generally trained error model can be configured to adapt to the user's own tendencies. As the user employs the spell checker, it keeps track of instances where an error is corrected. One way to track such instances is to monitor which word the user accepts from a list of corrections presented by the spell checker when it flags a word as incorrect. Another way is to monitor when the spell checker autocorrects a string the user has input. By tracking corrected errors, the spell checker collects <wrong, right> pairs that are specific to that individual. This can then be used to adapt the error model to the individual, by retraining the (α→β) parameters to take into account these individual error tuples.

It is desirable to use a large number of <wrong, right> pairs for training, as this typically improves accuracy of the resultant correction probabilities. One method for collecting the training pairs is to harvest it from available on-line resources such as the World Wide Web. A spell checker can auto-correct a string s into a word w when it is sufficiently certain that w was the intended word that was mistyped as s. For instance, the spell checker can auto-correct s into w if w is the most likely intended word according to our model, and the second most likely intended word is sufficiently less probable than w. The error model can thus be iteratively trained as follows:

(1) Obtain a set of <wrong, right> pairs and use them to train an initial model.

(2) Run the model over a collection of on-line resources. In all cases, when the model auto-corrects string s into word w, save the tuple <s,w>.
(3) Use these saved <s,w> tuples to retrain the model.
(4) Go to step (2).

Spell Correction Method

Once the error model is trained, the spell checker 40 is ready to identify and correct misspelled words. As noted earlier, the spell checker 40 attempts to correct an erroneously entered string s by returning the change that maximizes the probabilities of the source and error models, as follows:

$$\operatorname*{argmax}_{w \in D} P(s \mid w) \times P(w \mid context)$$

One approach to performing this search is to first return the k best candidate words according to P(s|w) and then re-score these k best words according to the full model P(s|w)*P(w|context).

To find $$\operatorname*{argmax}_{w \in D} P(s \mid w),$$

the spell checker can be configured to iterate over the entire dictionary D. However, it is much more efficient to convert the dictionary into a trie and compute edit costs for each node in the trie. Representing a dictionary as a trie is conventional and well known to those of skill in the art. Further efficiency gains can be had if the set of edits are stored as a trie of edit left-hand-sides, with pointers to corresponding tries of right-hand-sides of edit rules.

Depending upon the certainty that word w is intended when string s is input, the spell checker 40 has the following options: (1) leave the string unchanged, (2) autocorrect the string s into the word w, or (3) offer a list of possible corrections for the string s. The spell correction process may be represented by the following pseudo code:

For each space-delimited string s
Find the k most likely words
If there is sufficient evidence that s is the intended string
  Then do nothing
Else
  If there is sufficient evidence that the most likely word w is the intended word given the generated string s,
    Then autocorrect s into w
  Else
    Flag the string s as potentially incorrect and offer the user a sorted list of possible corrections.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. An apparatus, comprising:
a computing processor;
an electronic memory coupled with the computing processor;

an input device to receive an entered string s, and a program in the memory for execution on the computing processor to determine a probability P(s|w) expressing how likely a word w was to have been incorrectly entered as the string s, by partitioning the word w and the string s into different numbers of segments that define varying lengths of character sequences and computing probabilities for various partitionings, as follows:

$$P(s \mid w) = \sum_{R \in Part(w)} P(R \mid w) \sum_{\substack{T \in Part(s) \\ |T|=|R|}} \prod_{i=1}^{|R|} P(T_i \mid R_i)$$

where Part(w) is a set of possible ways of partitioning the word w, Part(s) is a set of possible ways of partitioning the string s, R is a particular partition of the word w, and T is a particular partition of the string s.

2. The apparatus as recited in claim 1, wherein the program determines how likely the word w is to have been generated.

3. The apparatus as recited in claim 1, wherein the program corrects the string s to the word w.

4. The apparatus as recited in claim 1, wherein the program identifies the string s as potentially incorrect.

5. The apparatus as recited in claim 1, further comprising a training program:

to determine, given a <wrong, right> training pair and multiple single character edits that convert characters in one of the right or wrong strings to characters in the other of the right or wrong strings at differing costs, an alignment of the wrong string and the right string that results is a least cost to convert the characters, to collapse contiguous non-match edits into one or more common error regions, each error region containing one or more characters that can be converted to one or more other characters using a substitution edit, and to compute a probability for each substitution edit.

6. The apparatus as recited in claim 5, wherein the training program assigns a cost of 0 to match edits and a cost of 1 to non-match edits.

7. The apparatus as recited in claim 6, wherein the single character edits comprises insertion, deletion, and substitution.

8. The apparatus as recited in claim 1, wherein the training program collects multiple <wrong, right> training pairs from online resources.

9. The apparatus as recited in claim 1, wherein the training program expands each of the error regions to capture at least one character on at least one side of the error region.

10. A system, comprising:

means for receiving an entered string s, and an input device to receive an entered string s, and means for determining a probability P(s|w) expressing how likely a word w was to have been incorrectly entered as the string s, by partitioning the word w and the string s into different numbers of segments that define varying lengths of character sequences and computing probabilities for various partitonings, as follows:

$$P(s \mid w) = \sum_{R \in Part(w)} P(R \mid w) \sum_{\substack{T \in Part(s) \\ |T|=|R|}} \prod_{i=1}^{|R|} P(T_i \mid R_i)$$

where Part(w) is a set of possible ways of partitioning the word w, Part(s) is a set of possible ways of partitioning the string s, R is a particular partition of the word w, and T is a particular partition of the string.

* * * * *